Figure 1:
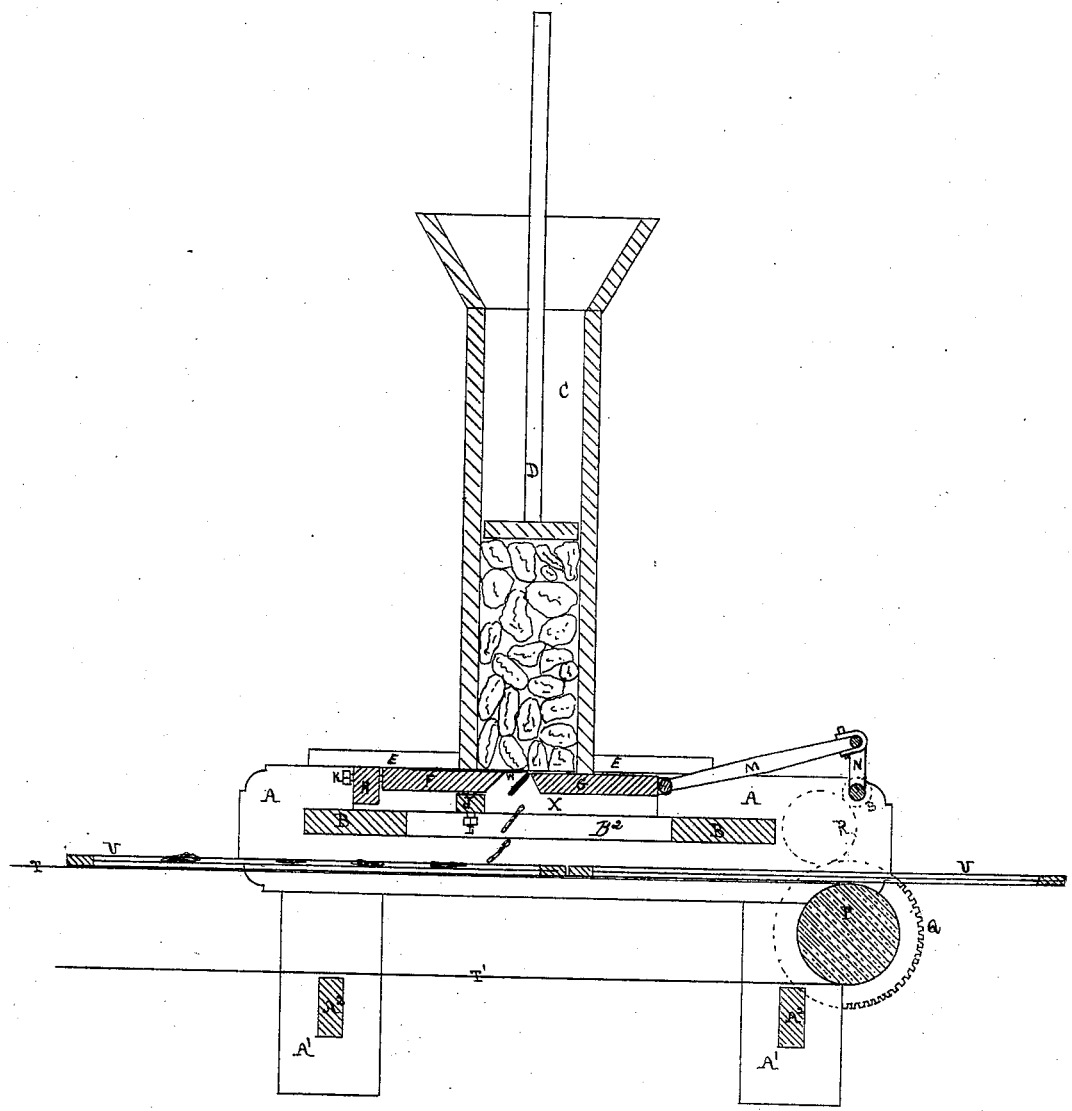

M. P. SMITH.
Improvement in Vegetable-Cutters.

No. 131,127.

Patented Sep. 3, 1872.

Witnesses
Jas. N. Kirkman
Wm. J. Crockford

Inventor
E. Marshall P. Smith

M. P. SMITH.
Improvement in Vegetable-Cutters.
No. 131,127.
3 Sheets--Sheet 2.
Patented Sep. 3, 1872.
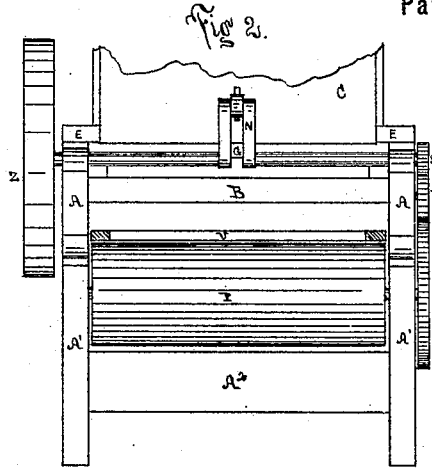
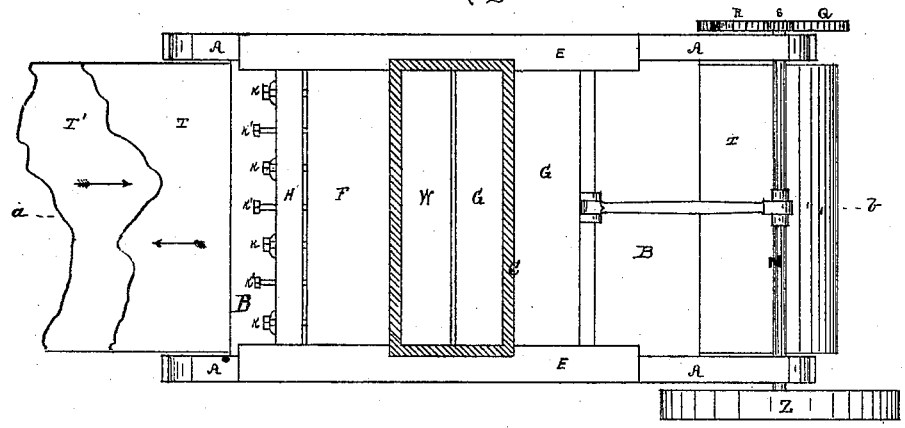
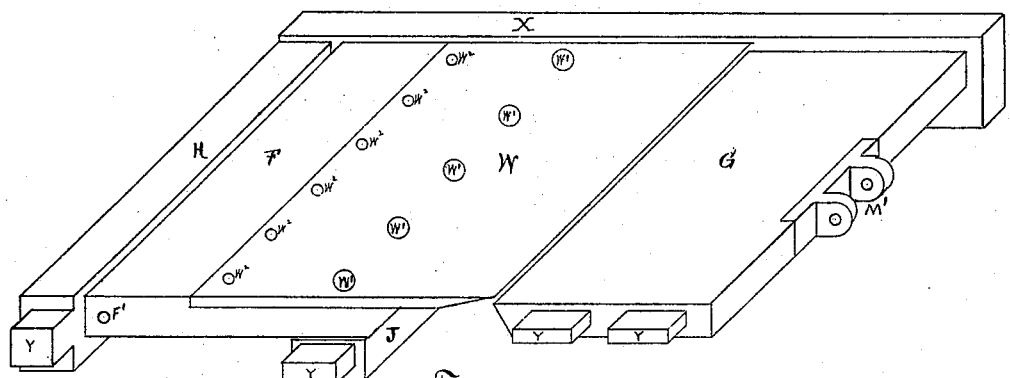
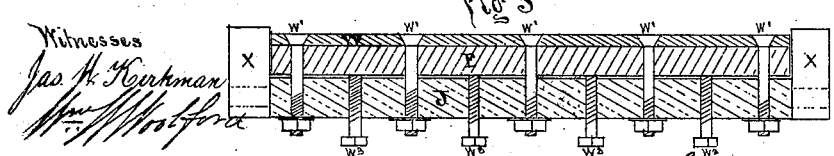
Witnesses
Jas. H. Kirkman
Inventor
Marshall P. Smith

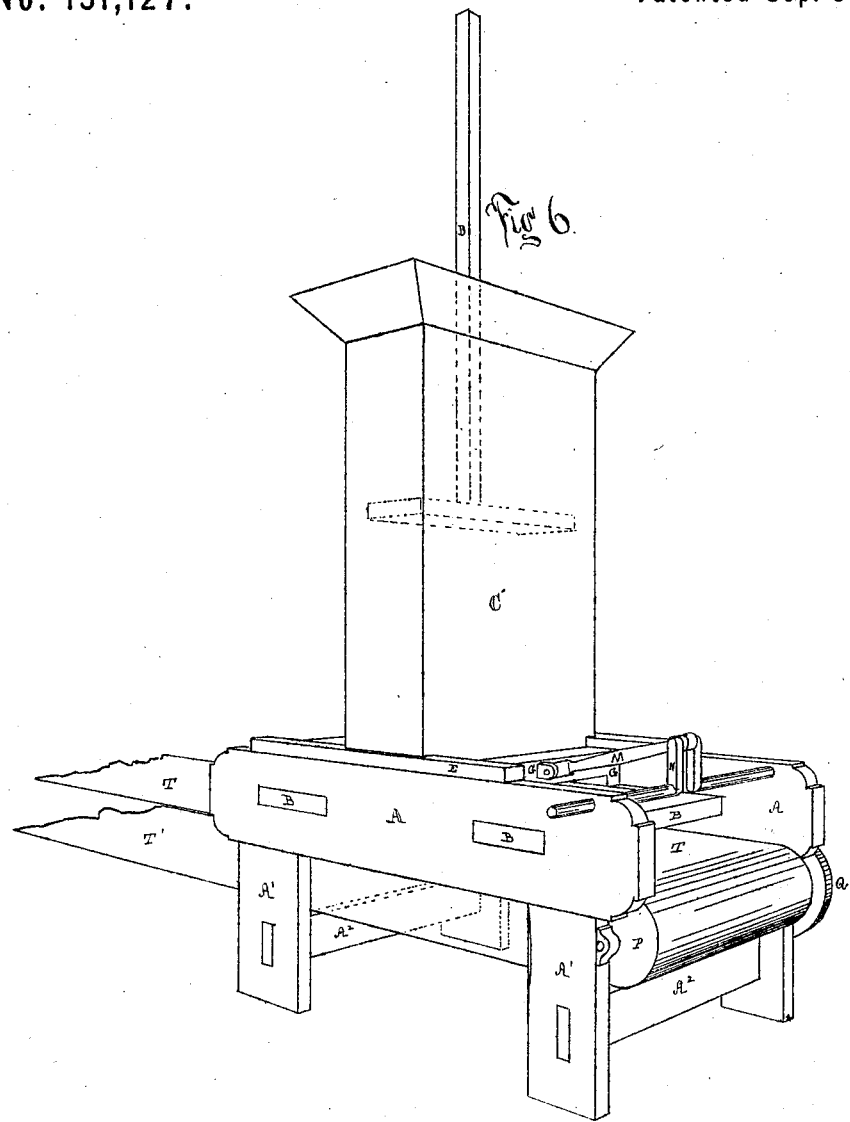

UNITED STATES PATENT OFFICE.

MARSHALL P. SMITH, OF BALTIMORE, MARYLAND.

IMPROVEMENT IN VEGETABLE-CUTTERS.

Specification forming part of Letters Patent No. 131,127, dated September 3, 1872.

Specification describing certain Improvements in Vegetable and Fruit Slicing Machines, invented by MARSHALL P. SMITH, of Baltimore, in the county of Baltimore and State of Maryland.

The object of this invention is to provide a simple and economical means of cutting or slicing vegetables and fruits, and at the same time to spread them automatically upon trays preparatory to drying them by natural or artificial heat.

In the drawing hereunto annexed, Figure 1 represents a vertical longitudinal section through the line $a\ b$. Fig. 2 represents the end elevation viewed from point $b$. Fig. 3 represents the top view, the hopper C being in section. Fig. 4 represents the cutter-board in perspective, on enlarged scale, one of the side pieces X being removed to show the section of the several parts. Fig. 5 is a cross-section of the cutter-board through the center of the bolts $W^1$. Fig. 6 is a perspective view of the whole machine, the driving pulley being removed.

A A are the two side frames of the machine, which rest upon legs $A^1$, and are joined together by the cross-pieces B B and $A^2$. H F W G is the cutter-board, shown in detail in Figs. 4 and 5. This cutter-board is constructed as follows: The side frames X, one of which is removed, are tenoned and mortised firmly into end pieces H, the under bolt-bar J, and the front board G, which, together, form the frame of the cutter-board. The knife-board F is not framed with the rest, but two bolts at opposite sides, at $F^1$, serve as pivots or hinges for the rear edge. The front part is bolted down to the cross-bar J by five or more countersunk headed bolts, $W^1$, which pass through the knife-blade W, the board F, and the cross-bar J. Between the bolts $W^1$ are four or more set-screws, $W^3$, passing through the bar J, their points bearing against the under side of the board F. These set-screws $W^3$, in connection with the bolts $W^1$, raise or lower the cutting-blade W, and regulate the thickness of the slice which is cut from the fruit or vegetable. The knife-blade should be as wide as the trays which are to receive the fruit. Through the rear bar H is a similar arrangement of bolts K and set-screws $K^1$, by which the knife-board is moved back or forth to adjust the knife, and take up the loss by grinding the knife-blade. The cutter-board slides upon bars $B^2$, on each side of and fastened to the frame, between and level with the cross-pieces B. Above the cutter-board is the hopper C, which is fastened to the pieces E E, by which it is bolted to the frame A. These side pieces project inward beyond the edge of the frame A, and serve as guides to keep the cutter-board from jumping or jarring. The cutter-board receives reciprocating motion from the pulley Z, crank-shaft N, pitman $M'$. On the end of the crank-shaft N is the small pinion S, which engages, through the intermediate spur R, with the spur Q, upon th shaft of the roller P; and by varying the size of the spur Q the speed of the roller P is regulated. Upon this roller P is an endless cloth or carrier, T $T'$, passing under the cutter-board, which may be extended as far as may be desired. U U are the wire-cloth or other trays, upon which the fruits and vegetables are spread for the purpose of drying them. D is the weighted follower, which presses the vegetables down upon the cutter-board. When the hopper is replenished and kept full all the time, the weight of the vegetable is sufficient and the follower is not needed.

In operation, the trays are fed into the machine at $b$, resting upon the endless cloth T, which carries them along under the reciprocating knife W, the vegetables or fruits falling evenly upon the trays, ready for drying.

In this machine, as described in my caveat of 1869, I used, in place of the endless cloth, a ratchet, fastened to the under side of the cutter-board, which operated upon lugs or holes in the sides of the tray-frames, while the trays slid upon rails; but I prefer the cloth movement.

I am aware that vegetable-cutters with reciprocating knives have been used before my invention, and such I do not broadly claim; but

I claim as my invention—

1. In a vegetable slicing and spreading machine the combination of the vertical bottomless hopper C, reciprocating cutters F W G, and carrier P T, substantially as described.

2. The cutter-frame F G X with the knife W, in combination with the bolts $W^1$ and K, and set-screws $W^3$ and $K'$, constructed and operated substantially in the manner set forth and described.

MARSHALL P. SMITH.

Witnesses:
JAS. W. KIRKMAN,
WM. W. WOOLFORD.